United States Patent [19]

Kampf

[11] Patent Number: 4,574,196
[45] Date of Patent: Mar. 4, 1986

[54] COIL SPRING CONVEYOR FOR POSITIONING AN EXTERNAL RADIOACTIVE STANDARD IN A LIQUID SCINTILLATION COUNTER

[75] Inventor: Richard S. Kampf, Costa Mesa, Calif.

[73] Assignee: Beckman Instruments, Inc., Fullerton, Calif.

[21] Appl. No.: 679,617

[22] Filed: Dec. 10, 1984

Related U.S. Application Data

[63] Continuation of Ser. No. 560,313, Dec. 12, 1983, abandoned, which is a continuation of Ser. No. 331,482, Dec. 15, 1981, abandoned.

[51] Int. Cl.$^4$ .................. G01N 23/00; G01T 1/20
[52] U.S. Cl. .................. 250/328; 250/497.1
[58] Field of Search .................. 250/328, 453.1, 497.1

[56] References Cited

U.S. PATENT DOCUMENTS

| | | | |
|---|---|---|---|
| 3,393,317 | 7/1968 | Spencer | 250/497.1 |
| 3,500,447 | 3/1970 | Frank | 250/328 |
| 3,669,093 | 6/1972 | Sauerwein et al. | 250/497.1 |
| 3,994,173 | 11/1976 | Ward | 250/497.1 |

Primary Examiner—Alfred E. Smith
Assistant Examiner—T. N. Grigsby
Attorney, Agent, or Firm—W. H. May; P. R. Harder; S. R. Markl

[57] ABSTRACT

In a liquid scintillation counter a standard radioactive source is supported within the tubular bore of a flexible coil spring conveyor. Spacer elements within the coil spring retain the source at a predetermined axial position along the spring. The coil spring is disposed in sliding engagement along a conveyor guideway. A drive roller drivingly engages the spring for conveying the source along the guideway between an operating position adjacent the counting chamber and a remote shielded position.

15 Claims, 4 Drawing Figures

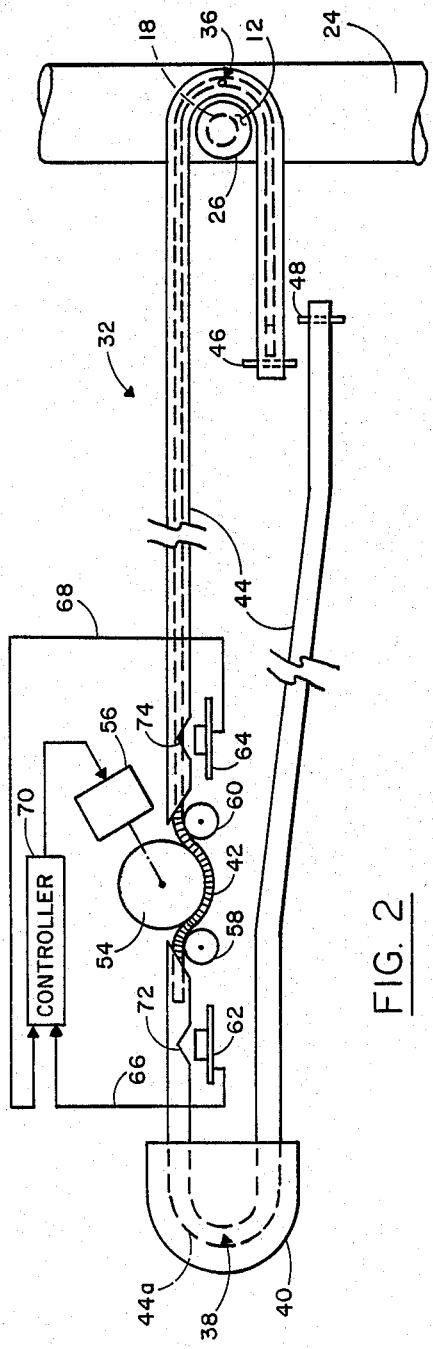
FIG. 2
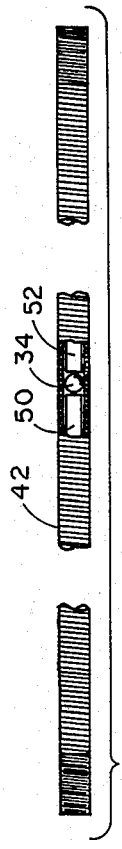
FIG. 3
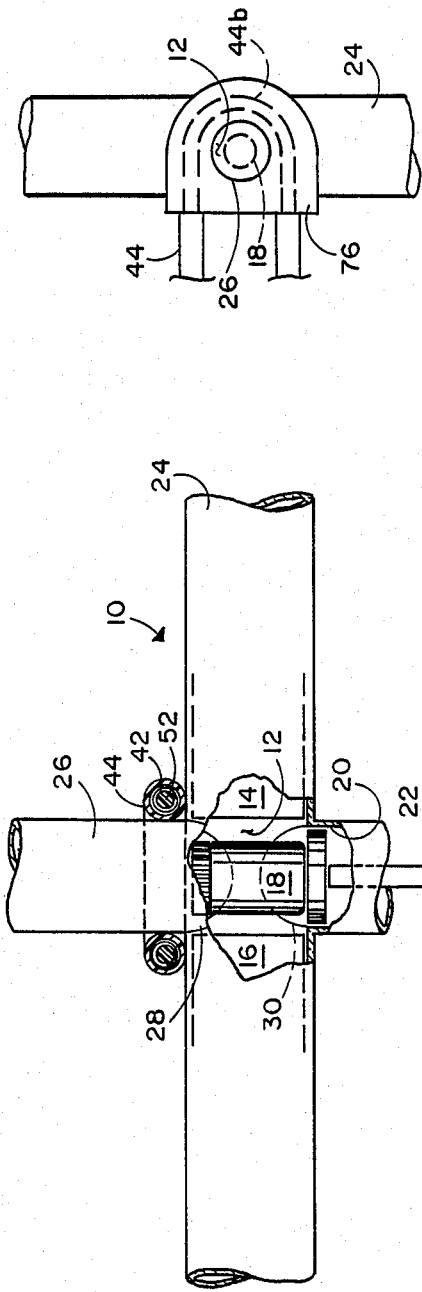
FIG. 4
FIG. 1

COIL SPRING CONVEYOR FOR POSITIONING AN EXTERNAL RADIOACTIVE STANDARD IN A LIQUID SCINTILLATION COUNTER

CROSS REFERENCE TO RELATED APPLICATION

This is a continuation of application Ser. No. 560,313, filed Dec. 12, 1983, now abandoned, which is a continuation of application Ser. No. 331,482, filed Dec. 15, 1981, now abandoned.

This application is related to copending application Ser. No. 277,791, filed June 29, 1981.

BACKGROUND OF THE INVENTION

1. Field of the Invention

The present invention relates to scintillation counting and, more particularly, to apparatus for positioning a standard radioactive source proximate the counting chamber of a liquid scintillation counter.

2. Description of the Prior Art

Liquid scintillation techniques have been widely adopted to measure the count rate or activity of samples containing radionuclides. It is well known that materials present in the sample can affect the process by which the liquid scintillation solution responds to the radionuclide radiation thereby causing a reduction in the measured count rate. This is commonly referred to as quenching, and numerous techniques have been developed in the prior art to measure and correct for quench in order to accurately determine the activity of the sample. One of the more widely adopted techniques is that of external standard channels ratio ESCR) determination exemplified by U.S. Pat. No. 3,381,130. A second and pioneering technique, commonly termed H-number determination, represents an improvement over the ESCR approach and is exemplified by U.S. Pat. No. 4,075,480. In both of the foregoing techniques, the sample is counted twice, once by itself and once while being irradiated by a known or standard radioactive source.

Typically, in each of the above techniques, a standard radioactive source is disposed in a carrier tube or conduit and is shifted back and fourth within the conduit between a shielded or rest location remote from the counting chamber and a counting or operating location adjacent the counting chamber. The radioactive source is usually a source of gamma radiation, such as cesium-137, incorporated within a suitable container such as a metal ball or pellet which will slide freely within the conduit. When a sample positioned is in the counting chamber, the radioactive source is shifted to its operating location to irradiate the sample, and the resulting scintillations (light flashes) emanating from the sample are counted. Thereafter, the source is returned to its shielded location and the scintillations produced solely by the radioactive sample are counted. This two-step counting procedure is repeated for each sample to be analyzed.

While various arrangements for shifting the radioactive source within the conduit have been adopted in commercial liquid scintillation counters, they have not proven satisfactory in all respects. In one approach, a pneumatic pump and a plurality of solenoid controlled valves are connected to the conduit. In a first operating mode, the pump propels the radioactive source from its shielded location to its operating location. Then, at the conclusion of the first counting step, the valves are selectively actuated to reverse the direction of air flow in the conduit such that the pump propels the source back to its shielded location. The second counting step is then conducted for the sample alone. The use of solenoid-controlled valves to control the direction of air flow results in a relatively expensive and mechanically complex control system which, in the course of switching operation, introduces undesired noise signals into the scintillation counting system.

A second and simpler approach utilizes only one-way air flow in the conduit to propel the radioactive source to the operating position at the counting chamber. After the first step of counting the irradiated sample, the air flow is terminated, and the radioactive source falls by gravity to the shielded location. The second counting step is then conducted for the sample alone. Unfortunately, it has been found with this arrangement that the radioactive source often sticks in the operating position adjacent the counting chamber and sample. When this happens, the source continues to irradiate the sample during the second counting step. Since the scintillations produced by the source totally swamp scintillations produced by the sample alone, under such circumstances the second counting step produces totally erroneous counting information.

In addition to the foregoing, the pneumatic systems may allow the radioactive source to oscillate or vibrate at the operating position adjacent the sample and may fail to identically position the source adjacent each successive sample elevated into the counting chamber. An oscillating or otherwise inaccurately positioned source can introduce errors in the sample counting and calibration procedures.

Finally, in the pneumatic positioning systems, the radioactive source is subject to shock and vibration during shifting back and forth and particularly when striking stops at the end of the conduit. This increases the likelihood that radioactive material will escape from the source container.

In another approach for shifting a radioactive source, exemplified in U.S. Pat. No. 3,500,447, the source is supported on the end of a cable, wire, rod, or wand and is inserted in one direction through a passage to a position directly beneath a sample vial in the counting chamber. In this position the source is received in a radial bore of the sample vial elevator. This approach has not been widely adopted perhaps because of the close dimensions and exacting mechanical tolerances required to coordinate source and elevator movement and to accurately and repeatably insert the source into the elevator recess directly below the sample.

SUMMARY OF THE INVENTION

The present invention resies in novel apparatus for positioning an external radioactive standard source in a liquid scintillation counter which overcomes the drawbacks of prior approaches. The new apparatus is simple and straightforward in construction and operation, easy to maintain, and is configured to accurately and reliably transport the source between operating and storage locations in the liquid scintillation counter.

To the foregoing ends, the invention in its broadest aspects contemplates (1) a flexible conveyor including an elongate coil spring having an interior bore configured to receive a radioactive source, and (2) means for retaining the radioactive source in a predetermined axial position within the coil spring. The invention further contemplates (3) guide means supporting the coil spring for movement along a conveyor path which path includes both storage and operating locations for the source, and (4) drive means coupled to drive the coil spring along the conveyor path for conveying the radioactive source between its storage and operating locations.

In accordance with a further aspect of the invention, the retaining means for the radioactive source comprises one or more flexible spacer elements adjacent the source within the coil spring and, preferably, extending for the remaining length of the coil spring. The spacer elements serve to retain and protect the source in a predetermined axial position within the coil spring and, further, provide a degree of structural rigidity for the coil spring without significantly diminishing its flexible nature.

In the preferred embodiment, the guide means supporting the coil spring for movement along the conveyor path comprises an elongate guideway or tubular conduit slidably receiving the coil spring. The drive means comprises a motor driven roller engaging the coil spring at a point in the conveyor path for effecting bidirectional movement of the coil spring along the conveyor path.

The flexible characteristic of the coil spring enables it to negotiate even a tortuous conveyor path defined by the guideway around and past various system components. In addition, the unitary though flexible structure of the coil spring conveyor enables it to be readily removed from or installed in the instrument thereby simplifying inspection and servicing of the instrument.

BRIEF DESCRIPTION OF THE DRAWINGS

FIG. 1 is a side elevational view of a liquid scintillation counter subassembly, cut away in part, to illustrate the counting chamber and a sample vial disposed therein. The figure further illustrates part of the radioactive source positioning apparatus of the invention oriented vertically above the counting chamber.

FIG. 2 is a generally diagrammatic, top plan view of the counting chamber and a storge receptacle for the radioactive source. The figure illustrates the source positioning apparatus of the invention situated along a conveyor path between the counting chamber and the storage receptacle.

FIG. 3 is a partial side elevational view illustrating a coil spring conveyor in accordance with the present invention. The coil spring is cut away in part to illustrate the radioactive source, retained by spacer elements, within the spring. The figure further illustrates, in opposite end views, the spring ends bent to retain the spacer elements and source therein.

FIG. 4 is a top plan view of a counting chamber, similar to FIG. 2, illustrating a plastic block having an internal bore therethrough defining the conveyor path at the counting chamber.

DESCRIPTION OF THE PREFERRED EMBODIMENT

Referring to FIG. 1, the invention is embodied in a liquid scintillation counter including a counting chamber housing 10 having a counting chamber 12 located between a pair of horizontally extending photomultiplier detectors 14 and 16. The detectors are adapted to detect light flashes from a liquid scintillator contained in a sample vial 18 positioned in the counting chamber. Housing 10 includes a generally horizontally disposed tubular section 24 receiving and supporting both photomultiplier detectors on opposite sides of the counting chamber and an intersecting vertically disposed tubular section 26 providing access to the counting chamber from above or below through vertical passage 20 therein. Tubular sections 24 and 26 intersect one another along upper and lower joints 28 and 30. The sample vials 18 are delivered in a conventional manner by a conveyor (not shown) to a location below housing 10. Each vial is elevated into the counting chamber 12 through a vertical passage 20 by an elevator 22. After counting operations are performed on the sample, the sample is returned to the conveyor by the elevator.

Referring now to FIGS. 1 and 2, the present invention is embodied in a radioactive source transport or positioning apparatus, indicated generally by numeral 32, for conveying a standard radioactive source 34 between an operating location 36 proximate counting chamber 12 and a remote storage location 38 within a lead shielding receptacle or block 40. To the foregoing ends, the present invention contemplates a flexible coil spring conveyor 42 (FIG. 3) supporting standard source 34 and a cooperating guideway 44 for supporting the coil spring conveyor and establishing a path for conveyor movement between the operating and storage locations.

In the preferred embodiment, guideway 44 is provided as a generally tubular conduit within which the coil spring conveyor 42 is disposed for movement along the conveyor path. Preferably guideway 44 defines an open loop path terminated at opposite ends thereof by respective stop pins 46 and 48. The conduit is preferably a material exhibiting a low coefficient of friction to facilitate sliding movement of the coil spring conveyor therein. Moreover, the conduit desirably is formed of a material which can be shaped, formed, or otherwise molded in tortuous, serpentine, or other such configuration to establish a conveyor path which passes around other system components traversing bends, corners, and other obstacles. Plastic material, such as nylon, Teflon, and polyethylene, are suitable materials for conduit 44.

The operating location 36 of radioactive source 34 proximate counting chamber 12 is established by the orientation of the conveyor path or guideway 44 at the counting chamber. As illustrated in FIG. 2, the conveyor path is disposed in a 180° arc around vertical section 26 of the counting chamber housing. Guideway 44 traverses the region of the counting chamber in this semicircular path at a fixed radial or circumferential distance from the vertical axis of the cylindrical sample vial 18 (FIG. 2). Moreover, as illustrated in FIG. 1, the semicircular path is disposed within a generally horizontal plane situated vertically above the sample vial and its contents. The operating location 36 for the source may be at any point along the 180° arc of guideway 44. In the preferred embodiment the operating location is established as illustrated at the 90° point of the arc.

FIG. 4 illustrates a modified guideway structure at the counting chamber 12. A plastic block 76 adjacent the chamber has an internal bore 44b molded therein defining the 180° conveyor path around vertical section 26 of the counting chamber housing. Such molded structures are preferred if a situation arises where the tubular conduit 44 is not readily bent or shaped in the desired guideway configuration.

As illustrated in FIG. 2, the storage location 38 for the radioactive source 34 is situated along guideway 44 at a point within the lead shielding block 40. Bore 44a through the lead block defines that portion of guideway 44 within the block.

In accordance with a primary aspect of the present invention, referring to FIG. 3, conveyor 42 is configured as an elongate, generally tubular, one-piece coil spring having an interior tubular bore configured to receive the radioactive source 34. The source is retained at a predetermined position within the coil spring by spacer elements 50 and 52 on opposite sides of the source within the coil spring. The spacer elements, comprised of a flexible tubular or cylindrical material, such as rubber, for example, preferably extend to the respective ends of the coil spring. At each end the spring is bent as illustrated in FIG. 3 to retain the corresponding spacer elements and the source within the coil spring. As a result, the spacers and source fill the axial length of the tubular bore within the coil spring and the spacers thereby serve to position the source at a predetermined location along the length of the coil spring.

For the liquid scintillation counter of FIG. 1, coil spring conveyor 42 is a pretensioned spring formed of 0.020 inch diameter wire. The coil spring is ¼ inch in outside diameter and is 51 inches in length. The radioactive source is 0.156 inches in diameter and is retained by spacer elements 50 and 52 at a position 13 inches from one end (and therefore approximately 38 inches from the other end) of the coil spring. The coil spring ends are color coded or otherwise marked to identify one from the other so that an installer can readily determine in which direction the coil spring is inserted in the conduit 44.

Again referring to FIG. 2, movement of flexible coil spring 42 within guideway 44 is under the control of drive roller 54 driven by motor 56. The circumferential surface of the drive roller is V-shaped for receiving and guiding movement of the coil spring conveyor. A pair of cooperating idler rollers 58 and 60 deflect the coil spring conveyor as it passes around drive roller 54 to establish frictional engagement between the conveyor and the drive roller. Motor controller 70 supplies signals in a conventional manner to motor 44 to effect motor drive of conveyor 42 either forward or rearward through guideway 44 and to inhibit motor drive with the radioactive source 34 at its operating or storage location.

In accordance with a further aspect of the invention, one or more sensors 62 and 64 are illustrated along the conveyor path. The sensors monitor the position of conveyor 42, and hence of the radioactive source 34 conveyed thereby, and supply control signals over lines 66 and 68 to motor controller 70. Controller 70 appropriately inhibits or advances movement of the conveyor. Sensors 62 and 64 are disposed on opposite sides of drive roller 54 adjacent cutouts 72 and 74 in guideway 44 for sensing the presence or the absence of the coil spring 42. To this end, the coil spring presents a reflective exterior surface along its length. Sensors 62 and 64 are conventional reflective photosensors which are each configured to direct a beam of light through respective cutout 72, 74 and to detect reflection of the light beam by coil spring 42 adjacent the cutout. In the absence of the coil spring no light is reflected back to the sensor. Each sensor generates an output signal having a first logic state when the coil spring is present and a second logic state when the coil spring is absent.

FIG. 2 illustrates coil spring 42 disposed along the conveyor path so as to position standard source 34 at the operating location 36 proximate the counting chamber 12. In such position one end of coil spring 42 abuts stop 46. The opposite end of the coil spring, as illustrated in dashed outline, is situated between sensor 62 and idler roller 58. As a result, with source 34 at operating location 36, the coil spring is adjacent sensor 64 but not adjacent sensor 62. The corresponding pair of sensor output signals indicate to controller 70 that the source is in its operating position 36.

In similar fashion when coil spring 42 is conveyed to position source 34 at its storage location 38, then one end of the coil spring abuts stop 48 while the opposite end is situated between idler roller 60 and sensor 64. In this position the coil spring is adjacent sensor 62 but is not adjacent sensor 64, and the corresponding pair of sensor output signal indicates to controller 70 that the source is in its shielded location.

In operation, assuming clockwise conveyor movement, motor 56 rotates drive roller 54 to drive coil spring conveyor 42 and hence to drive radioactive source 34 supported thereby from the shielded location 38 in lead block 40 to the operating location 36 proximate the counting chamber 12. In such position movement of the coil spring is stopped by stop pin 46. Sensors 62 and 64 respond to the absence and presence, respectively, of light reflection from the coil spring 42 and thereby signal controller 70 to stop the motor drive. A counting opertion is then performed on the sample in a normal fashion with the sample irradiated by the radioactive source 34. At the conclusion of this counting step, controller 70 supplies a drive signal to actuate motor 56 in a reverse direction to convey the source back to the shielded position in block 40. In this position, conveyor movement is stopped by stop pin 48. Sensors 62 and 64 respond to the presence and absence, respectively, of light reflection from the coil spring and thereby signal controller 70 to stop the motor drive. Counting is then performed on the sample in the absence of the standard source 34 in a conventional manner. Sample vial 18 is then removed from the counting chamber and replaced by the next sample to be counted.

FIG. 3 illustrates radioactive source 34 adjacent spacers 50 and 52. In a modification (not illustrated) the source is physically secured to one or both of the spacers. In this modification source 34, itself of conventional construction, is housed within a brass container having at least one stem protruding therefrom. The stem extends into and is cemented within the interior tubular bore of the one of spacers 50 and 52. The second stem, if provided, protrudes from the opposite side of the brass container and is cemented within the other spacer.

It will be apparent that the present invention provides a novel arrangement for positioning a radioactive standard source in a liquid scintillation counter which is simple in construction and operation, easy to maintain, and is configured to accurately and reliably transport the source between operating and shielded locations. In this regard coil spring 42 provides a flexible but sturdy conveyor configured for movement back and forth in a tortuous path along guideway 44. The radioactive source 34 is retained and protected by the cooperating coil spring and spacer elements 50 and 52. The coil spring is radially driven in forward or rearward directions by drive roller 54. Moreover, because of its flexible but sturdy characteristic, the coil spring can be readily pulled out of the conduit 44 for inspection or servicing of the instrument. In this regard an operator need only grasp coil spring 42 at a position between idler rollers 58 and 60 and pull it out of the guideway.

Installation of the conveyor is simply the reverse, the conveyor is fed in snake-like fashion into the guideway from positions between idler rollers 58, 60 and drive roller 54.

While a preferred embodiment of the invention has been illustrated and described, it will be apparent that modifications may be made therein without departing from the invention as defined in the appended claims.

What is claimed is:

1. In a liquid scintillation counter having a counting chamber for receiving a liquid sample containing a liquid scintillator and a sample of a radioactive substance to be counted, improved apparatus for positioning a radioactive source in an operating location to irradiate the liquid sample in the counting chamber comprising the combination of:
   (1) a flexible conveyor including an elongate, generally tubular coil spring section having an interior tubular bore configured to receive the radioactive source;
   (2) means for retaining the radioactive source in a predetermined axial position within the coil spring;
   (3) means supporting the coil spring for movement along a conveyor path between a storage location for the radioactive source remote from the counting chamber and an operating location for the radioactive source proximate the counting chamber; and
   (4) drive means coupled to the coil spring and operative to drive the coil spring along the conveyor path for conveying the radioactive source between the storage and operating locations.

2. The combination of claim 1 wherein the retaining means comprises one or more flexible spacer elements adjacent the radioactive source within the interior tubular bore of the coil spring.

3. The combination of claim 1 wherein the supporting means includes a conduit slidably receiving the coil spring.

4. The combination of claim 3 wherein the conduit is generally tubular in configuration.

5. The combination of claim 1 further including sensing means responsive to conveyor position along the conveyor path for controlling operation of the drive means.

6. The combination of claim 5 wherein the sensing means responds to coil spring position along the conveyor path with the radioactive source in either its storage or operating location.

7. The combination of claim 1 wherein the drive means comprises a drive roller in driving engagement with the coil spring.

8. The combination of claim 7 wherein the drive means is operable to drive the coil spring in forward and rearward directions along the conveyor path.

9. The combination of claim 6 wherein the drive means further includes one or more idler members cooperating with the drive roller to establish frictional engagement between the drive roller and the coil spring.

10. The combinatin of claim 2 wherein the radioactive source is secured to at least one of the spacer elements.

11. The combination of claim 2 wherein the flexible spacer elements extend the remaining length of the coil spring.

12. A conveyor for a radioactive source comprising: an elongate generally tubular coil spring section having an interior tubular bore; and means for retaining the radioactive source in a predetermined axial position within the coil spring.

13. The conveyor of claim 12 wherein the retaining means comprises one or more flexible spacer elements adjacent the radioactive source within the interior tubular bore of the coil spring.

14. The conveyor of claim 12 wherein the radioactive source is secured to at least one of the spacer elements.

15. The conveyor of claim 12 wherein the flexible spacer elements extend the remaining length of the coil spring.

* * * * *